(No Model.)  2 Sheets—Sheet 1.
T. A. WALDRIP.
TWIN CULTIVATING HARROW.
No. 501,609. Patented July 18, 1893.
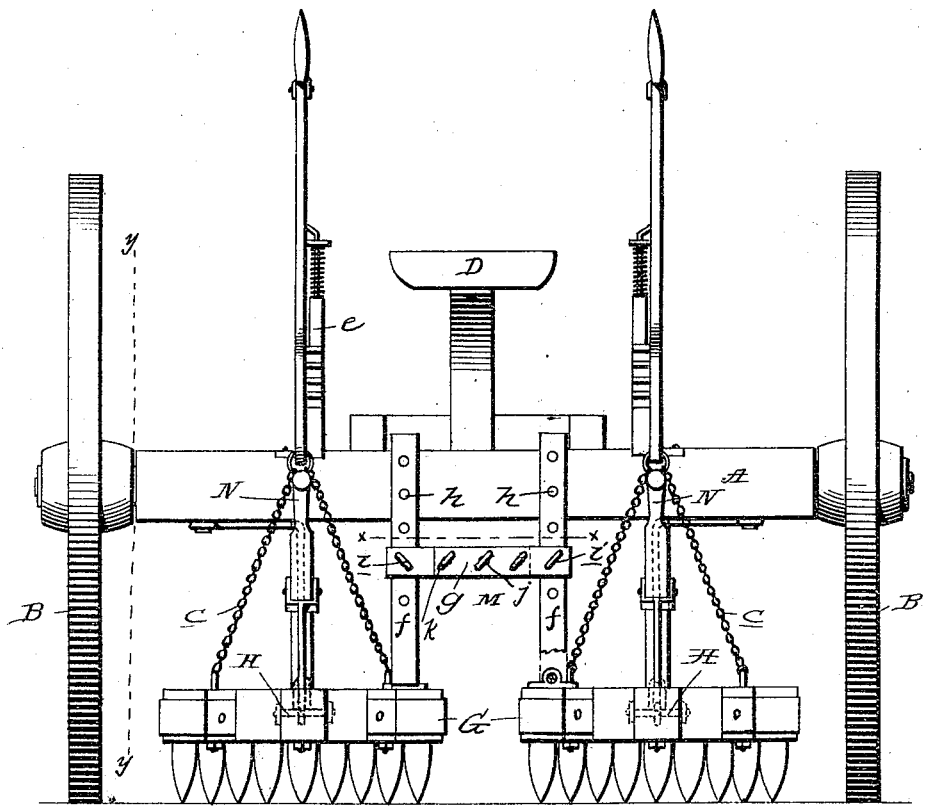
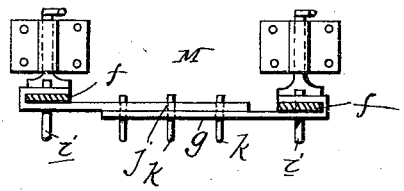
Witnesses:
C. H. Raeder
N. F. Matthews.
Inventor
Thomas A. Waldrip.
By James J. Sheehy
Attorney

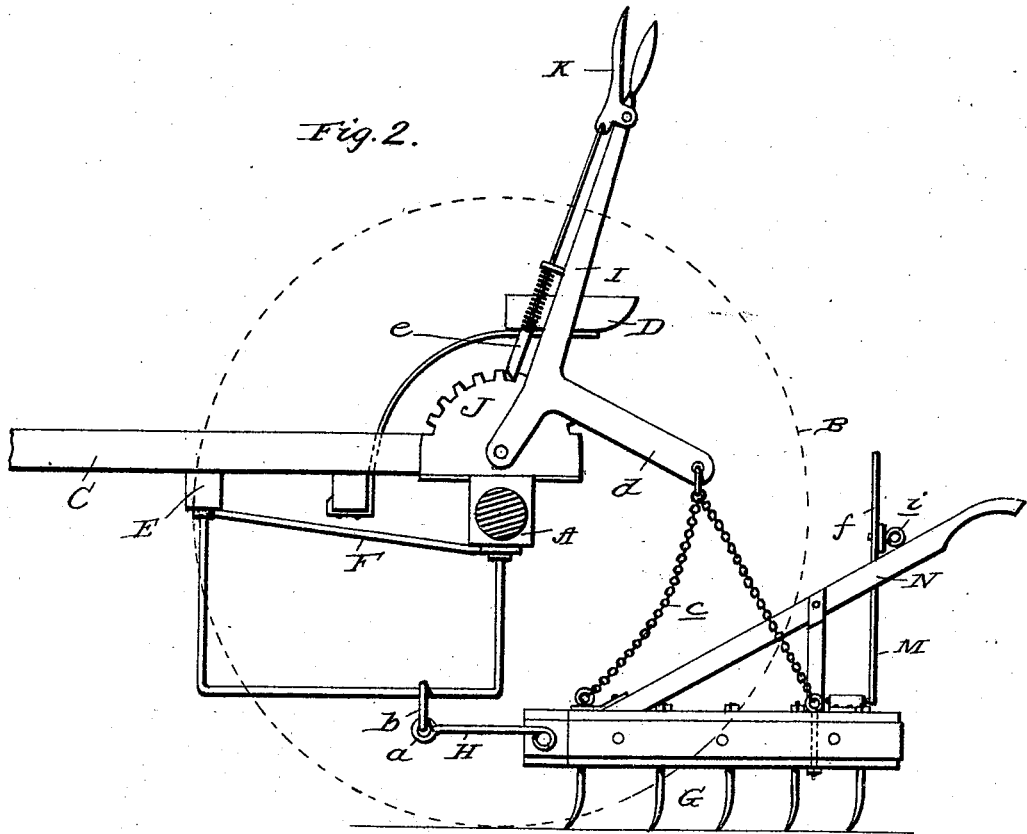

UNITED STATES PATENT OFFICE.

THOMAS A. WALDRIP, OF ALEXANDER, TEXAS.

TWIN CULTIVATING-HARROW.

SPECIFICATION forming part of Letters Patent No. 501,609, dated July 18, 1893.

Application filed February 20, 1893. Serial No. 463,119. (No model.)

*To all whom it may concern:*

Be it known that I, THOMAS A. WALDRIP, a citizen of the United States, residing at Alexander, in the county of Erath and State of Texas, have invented certain new and useful Improvements in Twin Cultivating-Harrows; and I do declare the following to be a full, clear, and exact description of the invention, such as will enable others skilled in the art to which it appertains to make and use the same.

My invention relates to improvements in that class of wheel harrows in which twin harrow frames are employed; and it has for its general object to provide a coupling for connecting the harrow frames, adapted to be adjusted and adjustably fixed, so as to adapt the harrow for cultivating corn, cotton, and the like of various heights.

Other objects and advantages of the invention will be fully understood from the following description and claims when taken in conjunction with the accompanying drawings, in which—

Figure 1, is a rear elevation of my improved harrow. Fig. 2, is a vertical, longitudinal section taken in the plane indicated by the line $y$, $y$, of Fig. 1, and Fig. 3, is a detail horizontal section taken in the plane indicated by the line $x$, $x$, of Fig. 1, looking downwardly.

In the said drawings similar letters designate corresponding parts throughout the several views, referring to which—

A, indicates the axle of my improved harrow upon which the traveling wheels B, are mounted, and C, indicates the tongue which is connected to the axle in any approved manner. This tongue C, supports a seat D, as illustrated, and it is provided at a point in advance of the axle with a cross bar E, to which the forward ends of the open frames F, are connected. The open frames F, are preferably formed from iron, and are connected at their rear ends to the axle A, whereby it will be seen that they will be securely held in position.

G indicates the twin harrow frames, which are preferably of a general triangular form, as shown. These frames G, are provided at their forward ends with clevises H; the eyes $a$, of which are connected to the frames F, by links $b$, as shown, whereby it will be seen that the rear ends of the harrow frames may be freely moved bodily vertically or laterally for a purpose presently described, the links $b$, being adapted to freely pass from the horizontal bars of the frames F, upon the rear vertical bars thereof.

Suitably connected to the frames G, as better shown in Fig. 2, of the drawings, are chains $c$, which are connected at their upper ends to the angular branches $d$, of the levers I, whereby it will be seen that when the said levers are moved forwardly, the harrow frames will be raised from the ground. Thus the operator or driver, seated upon the seat D, may readily raise one or both of the harrow frames so as to avoid large stones and other obstructions which would tend to break or damage the harrow teeth.

The levers I, are provided with spring pressed detents $e$, as better illustrated in Fig. 2, which are adapted to engage the segmental racks J, and are designed to be operated by the levers K, whereby it will be seen that the harrow frames may be fixed in an elevated position which is desirable when the harrow is moved from place to place.

In order to hold the harrow frames apart so that they will traverse paths on opposite sides of the row of plants to be cultivated, I provide the coupling M, which comprises the uprights $f$, the lapped straps $g$, and suitable connections for the same. The uprights $f$, of the coupling M, are pivotally connected to the harrow frames G, as shown, so as to permit of one frame being raised while the other is on the ground; and the said uprights are provided at intervals in their length with apertures $h$, for the passage of the connecting pins or bolts $i$, whereby it will be seen that the lapped straps $g$, may be fixed at various elevations so as to rest above plants of various heights, which is an important desideratum. These lapped straps $g$, are also provided with a series of apertures $j$, as shown, for the passage of the connecting bolts $k$, whereby the uprights $f$, and the harrow frames may be fixed at various distances apart, so as to adapt the harrow to cultivate plants of various widths.

In the practice of my invention I prefer to provide the harrow frames G, with suitable handle bars as N, so that they may be operated by a person walking behind the harrow, but I do not desire to be confined to said handle bars as their use is only preferable.

It will be seen from the foregoing description that I have provided a harrow of a cheap, simple, and durable construction and one adapted to be easily operated and adjusted so as to adapt it to cultivate plants of various sizes which is an important desideratum.

Having described my invention, what I claim, and desire to secure by Letters Patent, is—

1. In a wheel harrow, the combination with an axle, and the harrow frames connected with the axle; of the coupling M, comprising the uprights pivotally connected to the harrow frames and having apertures at intervals in their length, the adjustable lapped straps also having apertures at intervals in their length, and pins or bolts adjustably connecting the lapped straps together and to the uprights, substantially as specified.

2. In a wheel harrow, the combination with the axle and the frames F, connected to the axle and depending therefrom; of the harrow open frames having clevises at their forward ends, links connecting the clevises of the harrow frames to the frames F, the levers fulcrumed on the axle and having the rearwardly extending branches, a suitable means for locking said levers in their adjusted position and suitable connections between the levers and the harrow frames, substantially as and for the purpose specified.

3. In a wheel harrow, the combination of an axle, the open frames F, connected to the axle, and depending therefrom, the harrow frames having clevises at their forward ends, links connecting the clevises of the harrow frames to the frames F, and the coupling M, comprising the uprights pivotally connected to the harrow frames and having apertures at intervals in their length, the adjustable lapped straps also having apertures at intervals in their length, and pins or bolts adjustably connecting the lapped straps together and to the uprights, substantially as and for the purpose set forth.

In testimony whereof I affix my signature in presence of two witnesses.

THOMAS A. WALDRIP.

Witnesses:
W. M. DEISHER,
J. N. HAMRICK.